United States Patent [19]

Broome

[11] Patent Number: 5,615,929
[45] Date of Patent: Apr. 1, 1997

[54] BRAKE SYSTEM FOR A VEHICLE TRAIN

[75] Inventor: William S. Broome, Inkberrow, United Kingdom

[73] Assignee: Grau Limited, United Kingdom

[21] Appl. No.: 340,113

[22] Filed: Nov. 15, 1994

[30] Foreign Application Priority Data

Nov. 17, 1993 [GB] United Kingdom .................. 9323698
May 19, 1994 [GB] United Kingdom .................. 9410076

[51] Int. Cl.⁶ ........................................... B60T 13/00
[52] U.S. Cl. ..................... 303/7; 303/15; 303/3
[58] Field of Search ................. 303/7, 8, 13, 14, 303/15, 122.13, 122.15, 123, 155, 57, 69, 3

[56] References Cited

U.S. PATENT DOCUMENTS

| | | | |
|---|---|---|---|
| 3,158,409 | 11/1964 | Hughson et al. | 303/57 |
| 4,575,158 | 3/1986 | Grunert et al. | 303/57 |
| 4,792,192 | 12/1988 | Tveitane | 303/13 |
| 5,284,384 | 2/1994 | Herring | 303/7 X |
| 5,425,571 | 6/1995 | Wallestad et al. | 303/7 |

FOREIGN PATENT DOCUMENTS

2131508  6/1984  United Kingdom .
2270335  3/1994  United Kingdom .

*Primary Examiner*—Lee W. Young
*Attorney, Agent, or Firm*—Leydig, Voit & Mayer, Ltd.

[57] ABSTRACT

A vehicle train comprising a tractor and at least two trailers wherein each trailer has a brake sub-system. The brake sub-system includes a pressure transducer on the trailer responsive to pressure of a fluid pressure brake demand signals supplied thereto to provide an electrical brake demand signal and an electronic controller on the trailer responsive to the electrical brake demand signal to provide an electrical brake operating signal. The brake sub-system also includes a brake valve on the trailer responsive to the electrical brake operating signal supplied to the brake valve by the electronic controller to supply fluid to an actuator to operate a trailer brake under a brake pressure, from a primary source, determined in accordance with the electrical brake operating signal.

24 Claims, 4 Drawing Sheets

BRAKE SYSTEM FOR A VEHICLE TRAIN

BACKGROUND OF THE INVENTION

This invention relates to a brake system for a vehicle train comprising a tractor and a trailer wherein the trailer has a brake sub-system, hereinafter referred to as being of the kind specified, comprising a pressure transducer on the trailer responsive to a fluid pressure brake demand signal supplied thereto to provide an electrical brake demand signal, an electronic control means on the trailer responsive to the electrical brake demand signal to provide an electrical brake operating signal, and brake valve means on the trailer, responsive to the electrical brake operating signal supplied to the brake valve means by the electronic control means to supply fluid to an actuator to operate a trailer brake under a brake pressure, from a primary source, determined in accordance with the electrical brake operating signal.

Hitherto such a system has been applied to a vehicle train comprising a tractor and a single trailer in which case the fluid pressure brake demand signal is supplied from the tractor to the pressure transducer on the trailer along a relatively short supply line. (GB-2-,131,508)

SUMMARY OF THE INVENTION

An object of the invention is to provide a new and improved braking system for a vehicle train.

According to the present invention we provide a brake system for a vehicle train comprising a tractor and a trailer wherein the trailer has a brake sub-system of the kind specified and wherein the train comprises at least one further trailer, said at least one further trailer having a brake system of the kind specified and means to provide a fluid pressure brake demand signal to the pressure transducer of each brake sub-system.

Said means to supply a fluid pressure brake demand signal to the pressure transducer of each trailer may comprise a supply line extending from the tractor to each trailer to feed a fluid pressure brake demand signal generated on the tractor to the fluid pressure transducer of each trailer.

In such a braking system the fluid pressure demand signal is supplied from the tractor along a relatively long supply line running from the tractor to the rearmost trailer with a branch to the pressure transducer of each sub-system. Accordingly, there occurs a relatively long time delay between the brake demand signal originating on the tractor and the brakes being operated on the rearmost trailer due to the length of the supply line between the tractor and the rearmost trailer. Of course, the longer the trailer and/or the greater the number of trailers, the longer the delay.

Accordingly, a further object of the invention is to overcome or to reduce the above mentioned problem.

This further object is achieved by providing means to feed brake pressure to the pressure transducer of the or each trailer, other than the first trailer, from the preceding trailer.

Each trailer other than the first may be provided with selector means alternatively to supply the fluid pressure brake demand signal from the supply line or the brake pressure from the preceding trailer to the pressure transducer of the respective trailer.

Said selector means may have a first inlet for the fluid pressure brake demand signal and a second inlet for the brake pressure and an outlet connected to the pressure transducer and said alternative supply may be in accordance with a predetermined pressure difference between the pressure at the two inlets.

The predetermined pressure difference may be such that fluid pressure is supplied from that inlet which is at a predetermined higher pressure compared with the pressure at the other inlet.

Such selector may be an electrically operated selector valve means operated in accordance with air pressures being sensed by transducer means or may be a mechanical selector valve in which a valve member can be moved between sealing engagement with a valve seat of one inlet together with flow permitting relationship with a valve seat of a second inlet and sealing engagement with the valve seat of the second inlet together with flow permitting relationship with the valve seat of the one inlet.

The valve members may normally be biased into sealing engagement with the valve seat of the one inlet and movable against the bias into sealing engagement with the valve seat of the second inlet by a suitable higher fluid pressure at the one inlet than at the second inlet.

The brake valve means may comprise an electrically operable valve means, having an inlet for fluid from said primary source, and to which the electrical brake operating signal may be supplied. The electrically operable valve means may provide a fluid pressure brake operating signal to a supply valve means which supplies said fluid to said at least one brake actuator in accordance with the value of the fluid pressure brake operating signal.

The electrically operable valve means which is responsive to the electrical brake operating signal may comprise two solenoid valves of which a first is operable between first and second conditions in which it respectively provides for and prevents supply of fluid to a second solenoid valve, whilst the second solenoid valve is operable between conditions in a first of which it provides for passage of fluid from the first solenoid valve to provide the fluid pressure brake operating signal to the supply valve means and a second condition in which it provides for exhaust of fluid and reduction of the fluid pressure brake operating signal may be to zero.

With such arrangement of two solenoid valves, as described hereafter in relation to the embodiments shown in the drawings, it is possible by suitably relating the energisation of the solenoids of the two solenoid valves to arrange for braking to be controlled between a condition of brake application in which the two solenoid valves are in their first conditions, a brake holding condition in which the first solenoid valve is in said second condition and the second solenoid valve is in said first condition and release of braking in which the second solenoid valve is in its second condition and the first solenoid valve may be in its first or its second condition.

The solenoid valves may be arranged so that, in a first case, when energised, the first valve assumes its second condition above referred to, to prevent supply of fluid and when de-energised the first valve assumes said first condition to provide for supply of fluid for braking when combined with suitable energisation/de-energisation of the second valve respectively.

An electrically operated demand signal control valve may be provided in a line from the primary source to the electrically operable valve means.

The control valve may be operable to interrupt feed of fluid from the primary source to the electrically operable valve means when the transducer means does not detect a fluid pressure brake demand signal.

Each electronic control means may be responsive to an electrical signal from the trailer indicating a brake application command, to signal the control valve to feed fluid from the primary source to the electrically operable valve means.

The demand signal control valve may be provided, in a passage to feed fluid from said primary source to the electrically operable valve means, to act on the fluid from said source, and there being a selector valve having a first inlet connected to a passage for the demand signal, a second inlet connected to said passage from said source and an outlet connected to the electrically operable valve means, whereby when the demand signal control valve restricts supply of the fluid from the source the selector valve permits the demand signal to flow to the electrically operable valve means whilst when the demand signal control valve permits less restricted or free supply of fluid from the source, the selector valve prevents the demand signal from flowing to the electrically operable valve means.

Failure in the supply of fluid pressure to said primary source may be detected by a pressure sensitive valve means, with the pressure sensitive valve means being responsive to said fluid pressure falling below a predetermined pressure to cause brake application.

The pressure sensitive valve means may comprise a pressure protection valve connected in a main fluid pressure supply line to said primary source and responsive to pressure in the main supply line to permit passage of fluid when the pressure exceeds a predetermined pressure and to prevent passage of fluid when the pressure is at or below said predetermined pressure.

The vehicle brakes may comprise spring brakes having spring biasing means adapted to apply the brakes but whose effect is normally rendered inoperative by fluid pressure applied to a hold-off chamber at a pressure above a predetermined pressure, such as 70 psi, and in which normal operation of the brakes occurs by application of said brake pressure to an operating chamber.

Where the vehicle brakes supply comprise such a spring brake, fluid pressure to the hold-off chamber may be supplied via a quick release valve responsive to pressure in a line from the quick release valve to the spring brake and to pressure in a line from said primary source to the quick release valve to discharge fluid from the holding chamber to exhaust when the pressure in the line to said primary source falls below a predetermined pressure.

Fluid pressure may be supplied to the quick release valve from the source via the pressure protection valve. A one-way valve may be provided in a line from the pressure protection valve to the quick release valve to prevent flow in the direction from the quick release valve to the pressure protection valve.

A branch line may extend from said supply line on the quick release valve side of the one way check valve via a second one-way check valve which prevents flow of fluid in the direction towards the quick release valve and which extends to a line from the source on the upstream side of the emergency release valve.

Where the vehicle brakes comprise conventional air operated brakes responsive only to application of brake pressure to the brakes, and not having any spring application facility, the pressure sensitive valve means may comprise an emergency transducer valve, the valve being responsive to said fluid pressure falling below a predetermined pressure to direct fluid pressure from the primary source to said at least one brake actuator.

BRIEF DESCRIPTION OF THE DRAWINGS

Two embodiments of the invention will now be described by way of example with reference to the accompanying drawings, wherein.

DESCRIPTION OF THE PREFERRED EMBODIMENTS

Figure 1:
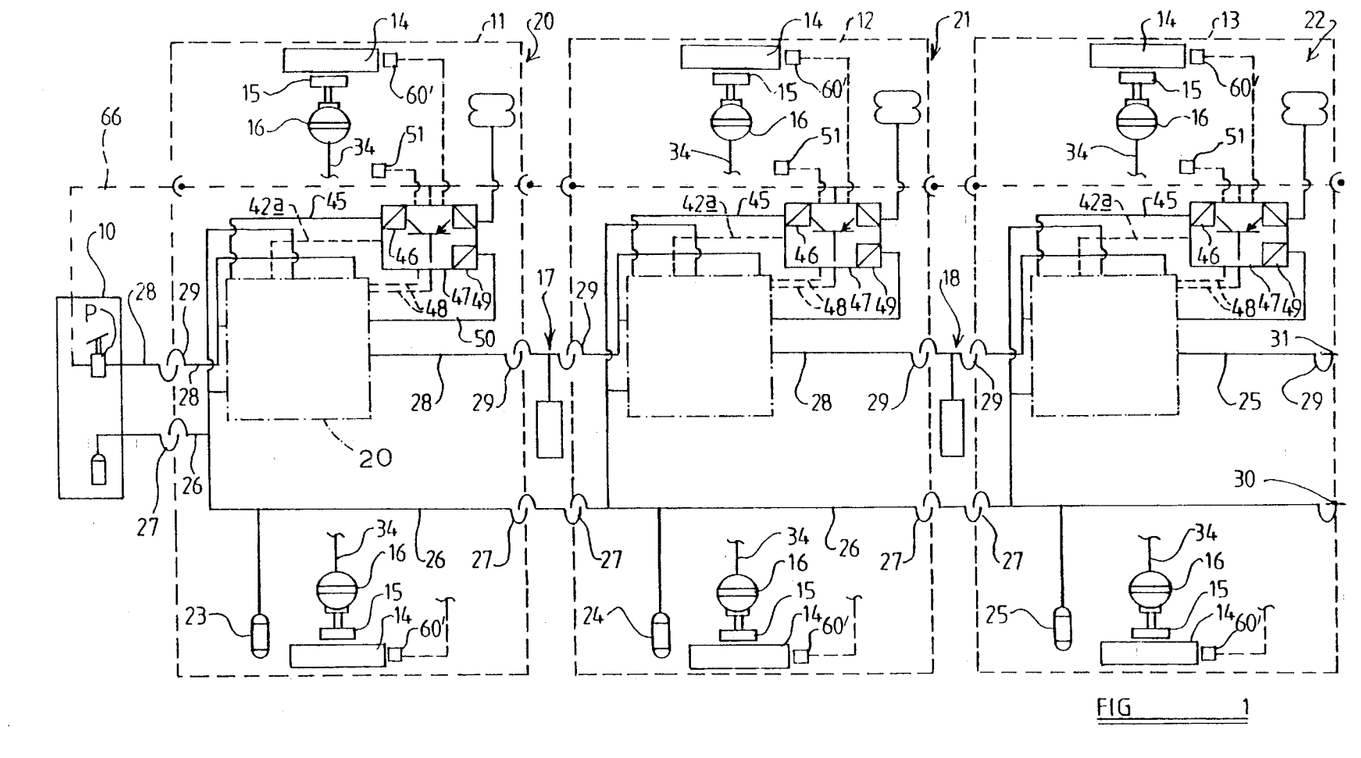
FIG. 1 is a diagrammatic illustration of a vehicle train comprising a tractor and three trailers embodying the present invention.

Referring to the Figures, a vehicle train comprises a tractor vehicle 10 and three trailer vehicles 11, 12, 13.

The first or front trailer 11 is articulated to the tractor 10 through a conventional fifth wheel coupling and has a single axle at the rear with wheels 14 at opposite ends of the axle. The wheels 14 have brakes 15 operated by a brake actuator 16. The second or middle trailer 12 has, at the rear, similar wheels 14, brakes 15 and brake actuators 16 but at its forward end it is coupled to the rear of the first trailer 11 by a bogey device 17 which is mounted to the fifth wheel coupling of the trailer 12 and which may be provided with a braking system which does not form part of the present invention.

The third or rearmost trailer 13 likewise has wheels 14, brakes 15 and brake actuators 16 at the rear and is coupled to the rear of the second trailer 12 by a bogey device 18 similar to the bogey device 17.

The brake actuators 16 of each trailer are operated by a brake sub-system provided on each trailer and indicated generally at 20, 21, 22 on the three trailers 11–13 respectively.

Each trailer is provided with a reservoir for air, illustrated at 23–25 respectively.

Air is supplied to each reservoir 23 via a main air supply line 26 which is provided with suitable couplings 27 between the tractor and trailers. A fluid pressure brake demand signal is generated on the tractor by the operator's brake pedal P and is fed via a demand signal supply line 28 from the tractor 10 sequentially to the brake sub-systems 20–22 of the trailers 11–13. Suitable couplings 29 are provided between the tractor and trailer vehicles in conventional manner. Of course, the couplings 27, 29 at the rear of the rearmost trailer 13 are provided with blanking arrangements 30, 31 respectively to close off these couplings.

Figure 2:
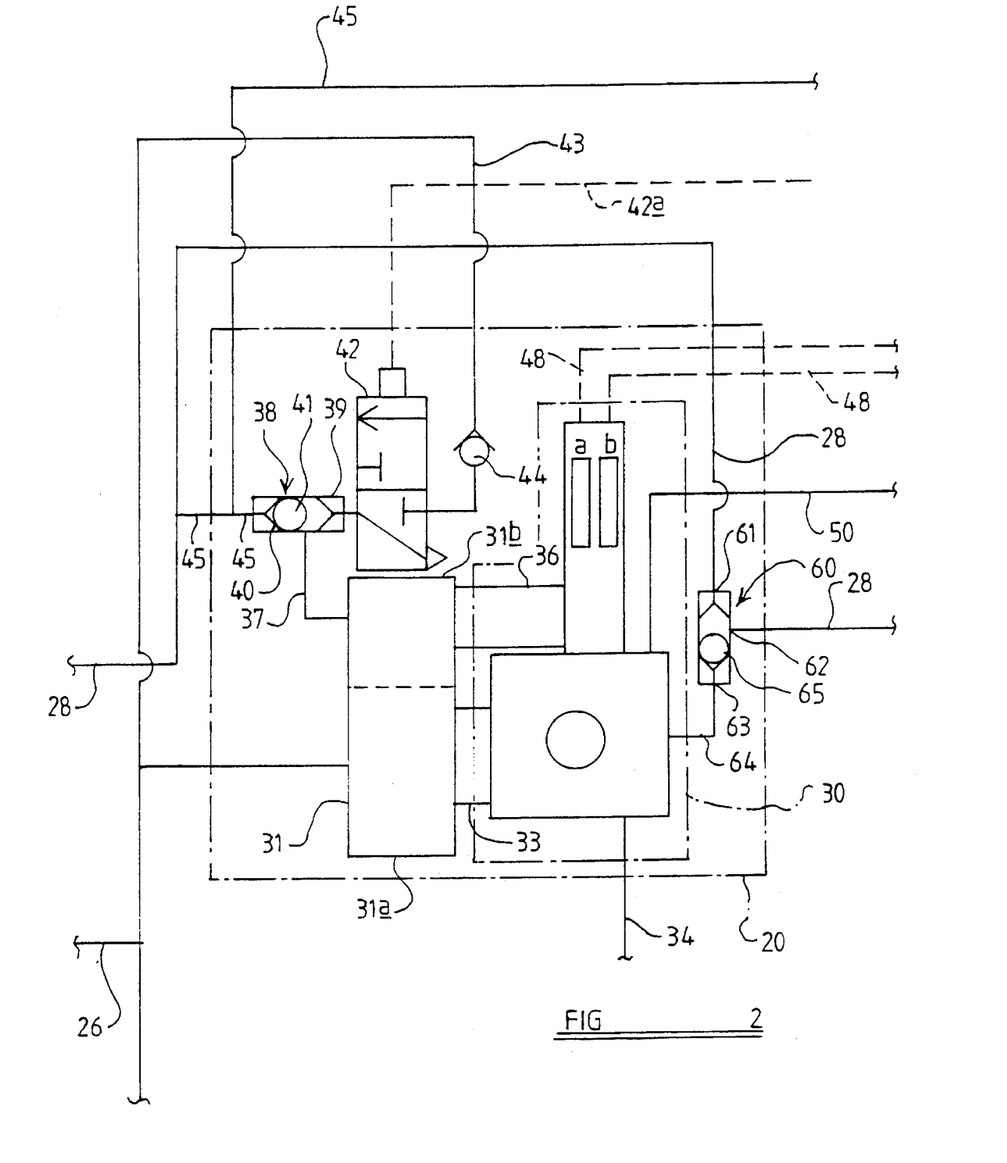
FIG. 2 is a diagrammatic illustration, to an enlarged scale, of a trailer brake sub-system of the vehicle train shown in FIG. 1.

Each brake sub-system 20, 21 or 22 is identical and for convenience the part of the braking sub-system 20 shown in box outline in FIG. 1 is shown in FIG. 2 to an enlarged scale and will be described in more detail hereinafter. It should be appreciated that the description and illustration of the sub-system 20 is equally applicable to the other sub-systems 21 and 22.

The brake sub-system comprises a brake valve means which comprises two electro-pneumatic relay valves (EPRV) 30 connected to a manifold 31 to provide a channel for each wheel 14. If more than two channels are required a corresponding number of EPRV's 30 are connected to the manifold 31.

Figure 3:
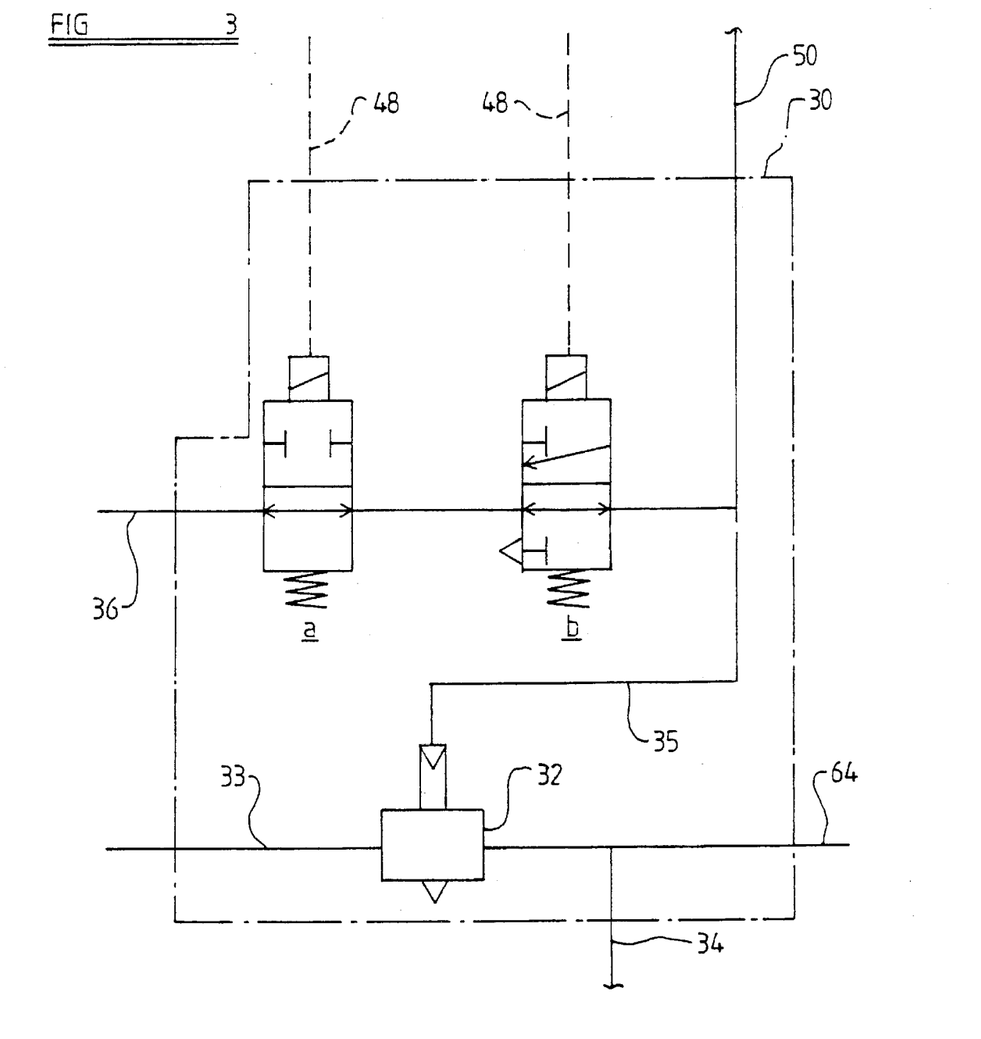
FIG. 3 is a diagrammatic illustration to an enlarged scale of an electropneumatic relay valve of the brake sub-system of FIG. 2.

Referring now to FIG. 3, each EPRV 30 comprises an electrically operable valve means and a supply valve means. The supply valve means comprises a conventional relay valve 32 to which main air supply is fed from a lower part 31a of the manifold 31 via line 33 and from which brake pressure is fed to an associated one of the brake actuators 16 by a respective line 34. The magnitude of the brake operating pressure in line 34 is modulated by the relay valve in accordance with a fluid pressure brake operating signal fed to the relay valve on line 35 from the electrically operable valve means comprising a pair of solenoid valves a, b. Fluid is fed to the solenoid valves a, b on line 36 from an upper part 31b of the manifold 31.

The manifold part 31b is supplied with air via line 37 from a selector or shuttle valve 38. In this example the selector or shuttle valve comprises a mechanical 2-way check valve, having a first inlet 39, and a second inlet 40 and a valve member 41 which can be moved into sealing engagement with a valve seat associated with the port 40 whilst permitting flow through the port 39 and can be moved out of sealing engagement with the seat of the port 40 and into sealing engagement with a valve seat of the port 39, whilst permitting flow through the port 40 when the pressure at port 40 exceeds that at port 39. The port 39 is connected to a solenoid operated demand signal control valve 42 which is supplied with air from the reservoir 23 via line 43 and one-way valve 44.

It is preferred that the valve member 41 is unbiased, movement into sealing engagement with the valve seat associated with the port 40 resulting from supply of air from the demand signal control valve 42 as hereinafter to be described.

If desired, however, the valve member 41 may be normally resiliently biased into sealing engagement with the valve seat associated with the port 40 and in this case flow through the port 40 is permitted only when the pressure at the port 40 exceeds that at the port 39 by a predetermined amount to overcome such biasing force.

A branch 45 from line 28 supplies the fluid operated brake demand signal to the inlet 40 of shuttle valve 38 and also to a pressure transducer 46 associated with an electronic control unit 47 but which may be provided separate therefrom at a desired location and connected to the unit 47 by an electrical line. The transducer 46 is responsive to the fluid pressure brake demand signal provided in line 45 and supplies a corresponding electrical brake demand signal to the controller 47.

The controller 47 provides an electrical brake operating signal on electrical lines 48 to the solenoids a, b of the EPRV 30.

The electronic controller 47 is provided with a further pressure transducer 49 to which air under pressure is fed via line 50 from the relay valve 32 to provide a feedback electrical signal to the controller 47 responsive to the pressure in the line 35. If desired, the transducer 49 may be provided closer to, or in, the line 35 and electrically connected to the controller 47.

Normally, when there is no brake application the demand signal control valve 42 is de-energised due to the transducer 46 detecting the absence of a brake demand signal on line 28. Hence supply air in line 43 is blocked so that no connection is provided for flow of air from line 43 to the solenoid valves a, b of the EPRV 30. Any pressure in the passage 35 from the valve b to the relay valve 32 will be exhausted to atmosphere via shuttle valve 38 and the demand signal control valve 42 so no brake application will result.

When brake application is required, the transducer 46 may sense the pressure of the fluid pressure brake demand signal and send a corresponding electrical brake demand signal to the controller 47 which sends a signal to the demand signal control valve 42 on line 42a. Alternatively, and preferably, to achieve a quick response, the controller 47 may be provided with an electrical signal on line 66 to indicate a driver command for brake application and this electrical signal may cause the controller 47 to send a signal to the demand signal control valve 42 on line 42a. This results in the valve member of the demand control valve 42 moving from the at rest position shown in FIG. 2 to its other state to permit air to flow from the line 43 via the shuttle valve 38, since the pressure in the line 43 is greater than that in the line 45 the valve member 41 is in sealing engagement with the valve seat of port 40. The air from line 43 flows via the manifold part 31b and connection 36 to the solenoid valves a, b which are in their de-energised position shown in FIG. 3 to permit passage of air therethrough to the control side of the relay valve 32.

The controlling air pressure for the relay valve 32 in the line 35 is detected by the transducer 49 and a signal is fed to the controller 47 until such pressure reaches the required value and when it does so the controller causes energisation of solenoid valve a while solenoid valve b remains de-energised so the required pressure in passage 35 is held. Brake application would normally be arranged by the controller 47 so that cyclic energisation and de-energisation of solenoid valve a causes the pressure in passage 35 and hence the pressure applied to the brake actuators 16 through the relay valve 32 to be increased in a stepwise manner compatible with operation of an EBS and ABS system.

When brake application is no longer required, re-energisation of solenoid valve b causes exhaust of air from passage 35 to atmosphere and hence release of the brakes in a controlled stepwise manner. The controller is preferably arranged to de-energise solenoid valve a but, if desired, the valve a may remain energised. When the transducer 49 detects atmospheric or near atmospheric pressure in line 35, the controller 47 causes the demand signal control valve 42 and the solenoid valves a and b to be de-energised.

If there should be any failure of electrical supply to the system, either total, or just failure of the valve 42, or if the valve 42 is rendered inoperative for any other reason whilst the system, or emergency, air supply on line 26 is maintained, the effect will be the de-energisation of the demand signal control valve 42 to return it to the position illustrated in FIG. 2. Means 51 are provided to give a warning to the driver if this happens and, when the driver applies the brakes, the fluid pressure brake demand signal is transmitted by the shuttle valve 38 which moves from its normally biased position, illustrated in FIG. 2, due to the absence of supply air at the inlet 39 due to the demand signal control valve 42 having moved to its at rest position and so the demand signal at the inlet 45 is fed via the outlet of the shuttle valve to the line 37 and thus by way of manifold 31b and line 36 to the solenoid valves a and b. Assuming that these are de-energised the fluid pressure brake demand signal then operates the relay valve 32 directly to cause corresponding application of the brakes.

On release of the thus applied brake demand pressure the valve member 41 of the shuttle valve 38 will close the inlet 40 and air will be exhausted to atmosphere via port 39 and valve 42.

When an incipient skid condition of an appropriate wheel 14 is noted by a sensor 60' associated with the wheel 14 the controller 47 sends appropriate signals to the solenoid valves a and b.

For example the controller may cause solenoid valve b to be energised so as to cause air in line 35 to be dumped to atmosphere whilst supply of air from line 36 is blocked by the valve a.

When the wheel speed sensor senses that the wheel has started to rotate again the pressure in the line 35 and hence the brake pressure in the line 34 may be increased stepwise in conventional manner by de-energising solenoid b and energising and de-energising solenoid a to permit progressive steps of increase followed by holding of pressure. It will be appreciated that in a system having the overall scheme described hereinbefore the exact configuration of the solenoid valves a, b and their requirements for energisation and de-energisation to cause brake application or release of brakes may be different from that above described depending, for example, on whether the solenoids are dependent upon the application of the brakes to provide electrical power thereto, for example when the trailer is provided with electrical power as a result of closing of a contact when the brakes are operated, commonly known as "stop light powering".

Referring now particularly to FIG. 1, when the brakes are applied in a normal braking operation the fluid pressure braking demand signal is fed from the tractor 10 along line 28 to the pressure transducer 46 of the first trailer and the brake sub-system 20 of the first trailer 11 operates in the above described manner to apply the brakes to the wheels 14 of the first trailer. In addition, the fluid pressure brake demand signal is fed via line 28 through couplings 29 to the second trailer 12 and subsequently to the third trailer 13.

Interposed in the line 28 on each trailer is selector means comprising a second selector or shuttle valve 60 which may be of similar construction to the first shuttle valve 38 previously described. The line 28 extends to a first inlet 61 of each shuttle valve 60. Each valve 10 has an outlet 62 and a second inlet 63 from which a line 64 extends to the relay valve 32 so as to communicate with the brake operating pressure in the line 34. The shuttle valve 60 has a valve member 65 which, if desired, may normally be biased into sealing engagement with a valve seat of the second inlet 63 to permit flow of air along line 28 via first inlet 61 and outlet 62. However, if the pressure of air in the line 64 exceeds that in the line 28 by a predetermined amount sufficient to overcome the bias, then the valve member 65 moves into sealing engagement with the valve seat of the first inlet 61 and permits flow of air from the line 64 to the line 28 downstream of the shuttle valve 60 via the second inlet 63 and outlet 62. If desired the line 64 may communicate with the brake pressure at any other suitable location.

When the brakes are applied and a fluid pressure brake demand signal is fed via the line 28, then the pressure in the line 28 at the shuttle valve 60 of the first trailer will be lower than the pressure in the line 64 presented to the second inlet 63 due to the relatively long path of the section of the line 28 which bi-passes the first brake sub-system 20 and accordingly air at brake operating pressure will be fed by the first shuttle valve 60 into the line 28 downstream thereof. This greater pressure will be fed to the pressure transducer 46 of the brake sub-system 21 of the second trailer 12 to cause that sub-system to operate as described hereinbefore and apply the brakes.

Again, the pressure at the second selector or shuttle valve 60 of the second trailer will be such that the pressure at the first inlet 61 supplied by the line 28 will be lower than the pressure at the second inlet 63 supplied by the line 64 and so again air from the line 64 at brake operating pressure will be fed to the section of the line 28 downstream of the second shuttle valve 60 of the second trailer to provide a fluid pressure brake demand signal for the pressure transducer 46 of the third brake sub-system 22 of the third trailer 13 which again operates as described hereinbefore.

In this case, although the pressure at the shuttle valve 60 will again be higher at the second inlet than at the first inlet, because this is the last trailer the section on the line 28 downstream thereof is blanked off and therefore functioning of the second shuttle valve 60 on this trailer is of no significance. The second shuttle valve is simply provided so that if it is desired at any time to connect a trailer to the third trailer, then the necessary components are present. This may be because it is desired to have a four trailer train, or because, in any particular case, the trailer which is the third trailer in the example illustrated may be used on another occasion as the first or second trailer in another vehicle train.

When ABS operation occurs on any particular trailer other than the last trailer, then the brake pressure of the respective brake sub-system will fall below the fluid pressure brake demand signal supplied from the tractor or a preceding trailer. Accordingly, the second shuttle valve of the relevant trailer will operate so that its valve member 65 closes the second inlet 63 and opens the first inlet 61 so that the fluid pressure brake demand signal in the line 28 bi-passing the particular brake sub-system is fed to the section of the line 28 downstream of the respective shuttle valve 60 and hence will be supplied to the pressure transducer 46 of the next following trailer. Since, in general, ABS operation will not commence until at least a short time after initial brake application, a sufficient time delay will, at least in general, have occurred for the fluid pressure brake demand signal in the line 28 supplied to the respective second shuttle valve 60 to have increased to the desired fluid pressure brake demand signal before the brake pressure in the line 64 drops on ABS application.

The controller 47 may be programmed to operate the solenoid valves a and b so as to cause the brake pressure to increase at a higher rate than is detected by the associated pressure transducer 46 to compensate for lag in the increase in pressure of the fluid pressure brake demand signal in the line 28 from the tractor to the first trailer as well as in the line 28 to a following trailer from a preceding trailer.

Moreover, as mentioned hereinbefore, each electrical controller 47 is provided with a signal along line 66, indicating that application has been commanded. In the present example this signal is the supply of electric current to the controller 47 from the stop light circuit of the tractor but may be any other electrical signal provided in response to the driver commmanding brake application.

This signal is recognised by the controllers 47 as indicating that the condition of brake application has occurred and immediately causes the controller 47 to send an electrical brake operating signal via line 42a to the demand signal control valve 42 to supply air from line 43 to the shuttle valve 38 to cause the valve 38 to occupy the position shown in FIG. 2 and so a) block the line 45 and so cause a rapid build-up of pressure at the transducer 46 and hence a rapid supply of the electrical brake operating signals on lines 48 and b) supply air to the solenoid valves a and b so as to cause the relay valves 32 to charge the lines 35 and brake actuators 16 with a predetermined pressure, for example of ½ bar which is sufficiently low that it does not effect brake, or at least any significant brake, application, but is sufficient to charge the lines and components and to cause the second shuttle valves 60 to change over from their normally biased position so that the valve members 65 are moved into sealing engagement with the valve seats associated with the first inlets 61.

Accordingly, when the controllers 47 receive a signal from the respective pressure transducer 46 to apply brakes, partial charging of the system and changeover of the shuttle valves 38 and 62 has occurred, thereby reducing the time taken to build the brake operating pressure in the lines 34 to that called for by the fluid pressure brake demand signal and thus reducing the time for supply of a fluid pressure brake demand signal to the next following trailer via the second shuttle valve 60 from the associated relay valve 32.

If desired, the trailer brake sub-systems may be provided with emergency functions, for example in the manifold part 31a and the emergency functions may be, for example, as described with reference to FIG. 9 of EP-A-0586203 including valve 436 and associated lines, check and shuttle valves.

The content of said specification is incorporated herein by reference.

Figure 4:
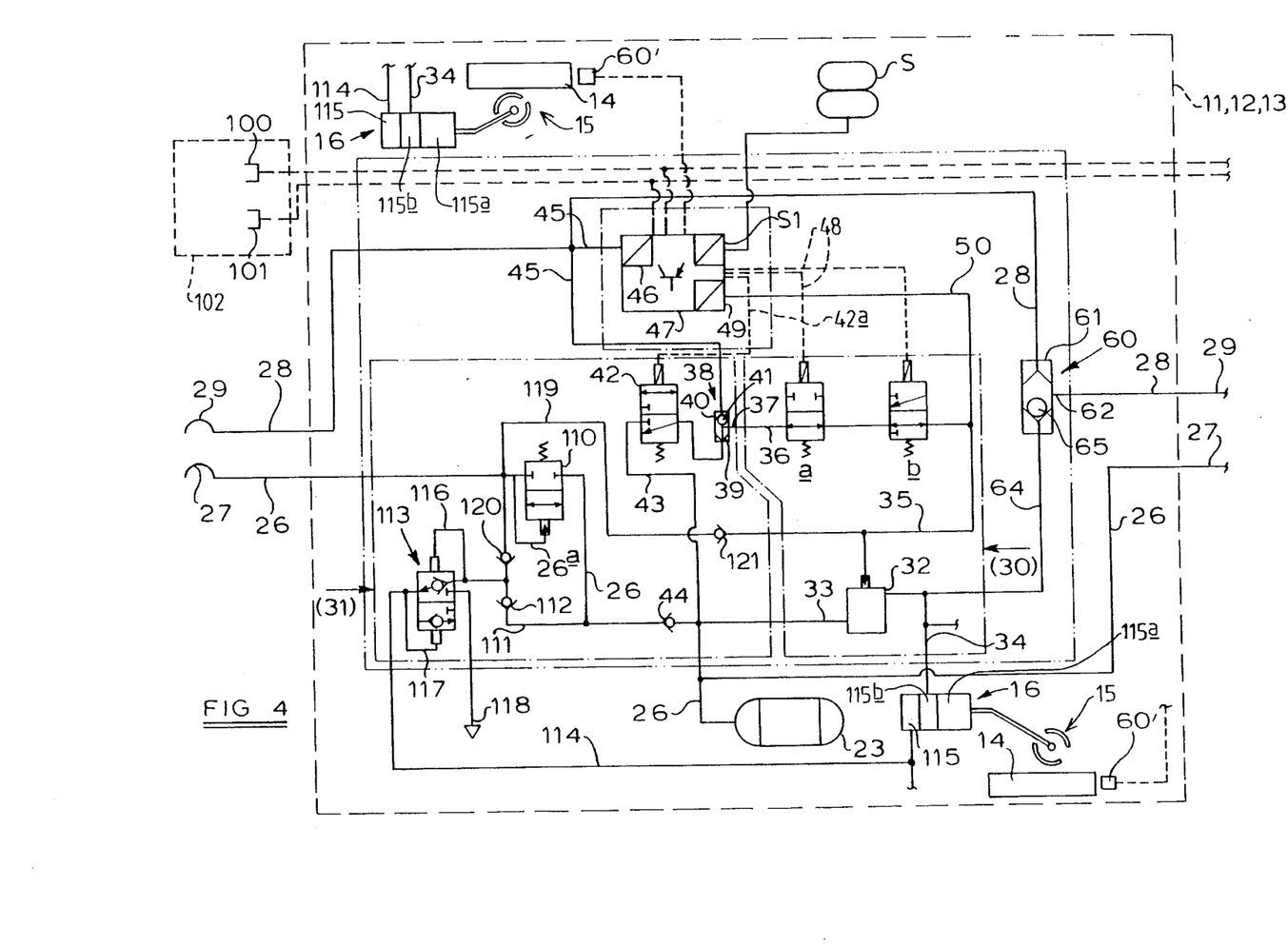
FIG. 4 is diagrammatic illustration, to an enlarged scale, of an alternative form of trailer brake sub-system of the vehicle train shown in FIG. 1.

Referring now to FIG. 4, an alternative form of trailer brake sub-system is illustrated. In this sub-system the controller and the EPRV's are as described in connection with FIGS. 1 to 3 and the same reference numerals are used in FIG. 4 as were used in FIGS. 1 to 3 in connection with these components as well as for other parts of the system to refer to corresponding parts.

In the sub-system of FIG. 4, the manifold 31 comprises a spring brake control manifold (SBCM) and in this embodiment the brakes 15 comprise spring brakes of conventional kind having spring biasing means 115a, hold-off chamber 115 and operating chamber 115b. The SBCM 31 has a shuttle valve 38 and a demand signal control valve 42 which correspond to the correspondingly numbered components in the previously described embodiment.

In this embodiment electrical supply may be provided by a conventional ISO7638 connector 100 providing a dedicated ABS supply or, and as intended in the present example, via the conventional stop lamp supply ISO1185 via connector 101.

Alternatively the system may utilise a single seven-way Vesplex connector 102.

The main air supply line 26 extends initially into an in line valve 110 which provides a pressure protection valve which has a valve member arranged, when moved by the pressure of air supplied through passage 26a to a position to transmit the air in line 26 whilst when the pressure of air in line 26 is below a predetermined pressure, in the present example 70 p.s.i., the valve member is biased to the position shown in FIG. 4 in which transmission of air through the valve is prevented, thereby preventing exhaust of air from the system downstream of the valve 110.

Downstream of the valve 110 the line 26 extends via a one-way check valve 44 to reservoir 23 and via an extension of line 26 to a coupling 27 to the next following trailer. A branch 43 extends from line 26 downstream of check valve 44 to the demand signal control valve 42. Another branch 111 of line 26 extends via one-way check valve 112 to a quick release valve 113 from which a line 114 extends to the "hold-off" air chambers 115 of the actuating means 16 of spring brakes 15.

The quick release valve 113 has a valve member which is responsive to air from pressure in line 111 fed on line 116 to maintain the valve member in the position shown in FIG. 4 when the pressure in line 111 is greater than the pressure in line 114 to which the valve member is also responsive by virtue of having said pressure in line 114 fed to act thereon by line 117, whilst if the pressure difference changes then the valve member will move to its other position so as to block line 111 and connect line 114 to exhaust 118.

A line 119 extends from line 111 via one-way check valve 120 and further one-way check valve 121 to join line 35 which provides the control signal to the relay valve 32.

The function of the sub-system as shown in FIG. 4 is essentially similar to that described hereinbefore except for the operation of the FBCM 31 which will now be described.

Assuming that there is at least 70 p.s.i. of air in the line 26, the valve 110 transmits air on line 26 to charge reservoir 23 and, via quick release valve 113 which will be in the position shown in FIG. 4 due to the pressure in line 116 acting on the valve member, to charge the "hold-off" chamber 115 of actuators 16 to thus release the vehicle brakes so that the trailer is free to move.

In the event of a break in the air supply in line 26, the spring brake control quick release valve 113 will move to its other position due to the pressure in line 117 being greater than that in line 116 so as to exhaust air from chambers 115 of the spring brake actuators 16 via exhaust 118, thus causing the spring brakes to apply the brakes of the trailer.

The demand signal control valve 42 operates in an essentially similar manner to valve 42 of the previously described embodiment and thus permits stop light operation of the system. In brief, when power is supplied to the valve 42 it is moved from the position shown in FIG. 4 to its transmitting position to supply air via shuttle valve 40 to the solenoids a and b. Air is then ready for the solenoids to modulate and supply to the relay valve 32 on line 35 similar to the previously described embodiment.

Its presence ensures good overall response in that upon energisation, it effectively shuts off control air supply at the shuttle valve 38 allowing the controlled pressure to quickly build up as the volume between the transducer 46 and the valve 38 is small. In addition, the valve 42 allows the solenoid a to be normally de-energised which is advantageous for a high performance solenoid.

If there is an electrical supply failure, then the brakes are applied, the control valve 42 dumps the air in the line between itself and the shuttle valve 40 to atmosphere and allows control air on line 45 to be applied through the solenoids a and b to the relay valve 32.

As in the previously described embodiment, all the pressure transducers 46, 49 and S1 associated with the air suspension S which measures air suspension pressure are located on a printed circuit board of the controller 47.

When the system is fully charged, if there is a failure in air supply to the reservoir 23, between the check valve 112 and the reservoir 23 or in the line 26 between the valve 110 and the reservoir 23 the following occurs. Air pressure in the line 26 downstream of the pressure protection valve 110 falls and hence the same falling pressure will be present on opposite sides of the check valves 120 and 112. When the pressure at the pressure protection valve 110 has fallen to 70 psi the pressure protection valve closes, (i.e. occupies the position shown in FIG. 4) and pressure on the upstream side of the valves 120 and 110 will be 70 psi whilst the pressure on the downstream side of valve 112 continues to fall and so the valve 112 closes and maintains a pressure of 70 psi upstream thereof. (If the pressure in line 26 is supplied from the tractor the pressure will increase above 70 psi and the valve 120 will close).

In addition, the quick release valve 113 will initially move to its other, not illustrated, position due to the pressure difference between the 70 psi applied in line 116 and the higher pressure, e.g. 120 psi, in the line 117 corresponding to the pressure in the line 114 obtaining from when the spring brakes 115 were charged. The spring brakes, in conventional manner, remain held off during such pressure fall as the 70 psi is above their application threshold.

When the pressure in line 117 has fallen to 70 psi the quick release valve 113 adopts a neutral condition and so the spring brakes 115 are maintained held off.

When the trailer supply air is released, for example by unhitching the trailer or if there is any leak in line 26 or coupling 27 upstream of the trailer, the one-way check valve 44 will prevent any decrease in the reservoir air pressure but the fall in pressure in line 116 will cause the quick release valve 113 to move to its other position to exhaust air in line 114 from spring brake chamber 115 to atmosphere via exhaust 118, thereby allowing the spring brakes to apply.

A one-way check valve 121 is provided for anti-compounding. When there is a reduction in pressure in line 119 (because of the above mentioned circumstances) the pressure reduction is communicated via the valve 121 to the line 35 so as to cause a consequential reduction in the control line pressure (if any) obtaining at that time. Check valve 121 eliminates independent forces from the spring and air pressure in the spring brake acting upon mechanical foundation brake parts simultaneously, which can overload the mechanical parts resulting in damage.

Under normal operation therefore the control pressure is measured, the suspension load is monitored and the required braking pressure is supplied to the brakes on the relay function. In a 2S/1M version the solenoids a and b not only provide an ECBS control but also an ABS facility.

If desired, the EPRV's 30 may provide electric brake control (ECBS) and multi-channel ABS may be provided simply by adding ABS relay valves downstream of the relay valves as shown in FIG. 4. However, it is preferred to provide the system in the form of three sub-assemblies comprising the controller 47, the SBCM 31 and a desired number of EPRV's 30 which provide both ECBS and ABS control.

As previously described, the SBCM contains the pressure protection valve 110, the one-way check valves 121, 44, 112 and 120 and the quick release valve 113 for the spring brake, as well as the demand signal control valve 42 and the shuttle valve 38.

The control lines 28 and main air supply lines 26 are also brought into this component and the reservoir supply portion of the line 26 is also connected thereto.

The SBCM is configured so that it can be bolted directly to the controller 47 and to the desired number of EPRV's.

In other respects, the sub-system described with reference to FIG. 4 functions in a similar manner to the brake sub-system described with reference to FIGS. 1 to 3.

If desired, in either embodiment, other forms of selector or shuttle valve may be used for any one or more of the mechanical two-way check valves described. For example, an electrically operated valve means may be provided in which a valve member or members is or are moved by electromagnetic means responsive to pressure sensed by transducers disposed in two inlets to the valves.

Moreover, if desired, instead of feeding brake pressure for the pressure transducer of the next following trailer at a pressure equal to that fed to the brake actuator there may be fed brake pressure which is proportional to such "full" brake pressure, for example by using a proportioning valve, and in this specification and claims the term brake pressure is used to encompass both "full" brake pressure and such a proportional brake pressure.

The features disclosed in the foregoing description, or the following claims, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A vehicle train comprising a tractor and at least two trailer wherein each trailer has a brake sub-system, comprising means to supply a fluid pressure brake demand signal, a pressure transducer on the trailer responsive to pressure of said fluid pressure brake demand signal supplied thereto to provide an electrical brake demand signal, an electronic control means on the trailer responsive to the electrical brake demand signal to provide an electrical brake operating signal, and brake valve means on the trailer responsive to the electrical brake operating signal supplied to the brake valve means by the electronic control means to supply fluid to an actuator to operate the trailer brake under a brake pressure from a primary source, determined in accordance with the electrical brake operating signal.

2. A brake system according to claim 1 wherein said means to supply said fluid pressure brake demand signal to the pressure transducer of each trailer comprises a supply line extending from the tractor to each trailer to feed said fluid pressure brake demand signal generated on the tractor to the fluid pressure transducer of each trailer.

3. A brake system according to claim 2 comprising means to feed brake pressure to the pressure transducer of each trailer, other than a first trailer, from the preceding trailer.

4. A brake system according to claim 3 wherein each trailer other than the first is provided with selector means alternatively to supply the fluid pressure brake demand signal from the supply line or the brake pressure from the preceding trailer to the pressure transducer of the respective trailer.

5. A brake system according to claim 4 wherein said selector means has a first inlet for the fluid pressure brake demand signal and a second inlet for the brake pressure and an outlet connected to the pressure transducer and said alternative supply is in accordance with a predetermined pressure difference between the pressure at the two inlets.

6. A brake system according to claim 5 wherein the predetermined pressure difference is such that fluid pressure is supplied from that inlet which is at a predetermined higher pressure compared with the pressure at the other inlet.

7. A brake system according to claim 4 wherein said selector means is a mechanical selector valve in which a valve member can be moved between sealing engagement with a valve seat of one inlet together with flow permitting relationship with a valve seat of a second inlet and sealing engagement with the valve seat of the second inlet together with flow permitting relationship with the valve seat of the one inlet.

8. A brake system according to claim 1 wherein the brake valve means comprises an electrically operable valve means, having an inlet for fluid from said primary source, and to which the electrical brake operating signal is supplied.

9. A brake system according to claim 8 wherein the electrically operable valve means provides a fluid pressure brake operating signal to a supply valve means which supplies said fluid to said at least one brake actuator in accordance with the value of the fluid pressure brake operating signal.

10. A brake system according to claim 8 wherein the electrically operable valve means which is responsive to the electrical brake operating signal comprises two solenoid valves of which a first is operable between first and second conditions in which it respectively provides for and prevents supply of fluid to a second solenoid valve, whilst the second solenoid valve is operable between conditions in a first of which it provides for passage of fluid from the first solenoid valve to provide the fluid pressure brake operating signal to the supply valve means and a second condition in which it provides for exhaust of fluid and reduction of the fluid pressure brake operating signal.

11. A brake system according to claim 10 wherein braking is controlled between a condition of brake application in which the two solenoid valves are in their first conditions, a brake holding condition in which the first solenoid valve is in said second condition and the second solenoid valve is in said first condition and release of braking in which the second solenoid valve is in its second condition and the first solenoid valve may be in its first or its second condition.

12. A brake system according to claim 10 wherein the solenoid valves are arranged so that, when energised, the first valve assumes its second condition above referred to, to prevent supply of fluid and when de-energised the first valve assumes said first condition to provide for supply of fluid for braking when combined with suitable energisation/de-energisation of the second valve respectively.

13. A brake system according to claim 10 wherein an electrically operated demand signal control valve is provided in a line from the primary source to the electrically operable valve means.

14. A brake system according to claim 13 wherein said control valve is operable to interrupt feed of fluid from the primary source to the electrically operable valve means when the transducer means does not detect a fluid pressure brake demand signal.

15. A brake system according to claim 13 wherein each electronic control means is responsive to an electrical signal from the trailer indicating a brake application command, to signal the control valve to feed fluid from the primary source to the electrically operable valve means.

16. A brake system according to claim 13 wherein the demand signal control valve is provided, in a passage to feed fluid from said primary source to the electrically operable valve means, to act on the fluid from said source, and there being a selector valve having a first inlet connected to a passage for the demand signal, a second inlet connected to said passage from said source and an outlet connected to the electrically operable valve means, whereby when the demand signal control valve restricts supply of the fluid from the source the selector valve permits the demand signal to flow to the electrically operable valve means whilst when the demand signal control valve permits less restricted or free supply of fluid from the source, the selector valve prevents the demand signal from flowing to the electrically operable valve means.

17. A brake system according to claim 1 comprising a pressure sensitive valve responsive to fluid pressure falling in a supply of fluid pressure to said primary source below a predetermined pressure to cause brake application.

18. A brake system according to claim 17 wherein the pressure sensitive valve comprises a pressure protection valve connected in a main fluid pressure supply line to said primary source and responsive to pressure in the main supply line to permit passage of fluid when the pressure exceeds a predetermined pressure and to prevent passage of fluid when the pressure is at or below said predetermined pressure.

19. A brake system according to claim 17 wherein the vehicle brakes comprise air operated brakes responsive only to application of brake pressure to the brakes, and the pressure sensitive valve means comprises an emergency transducer valve, the valve being responsive to said fluid pressure falling below a predetermined pressure to direct fluid pressure from the primary source to said at least one brake actuator.

20. A brake system according to claim 17 wherein the vehicle brakes comprise spring brakes having spring biasing means adapted to apply the brakes but whose effect is normally rendered inoperative by fluid pressure applied to a hold-off chamber at a pressure above a predetermined pressure and in which normal operation of the brakes occurs by application of said brake pressure to an operating chamber and fluid pressure to the hold-off chamber is supplied via a quick release valve responsive to pressure in a line from the quick release valve to the spring brake and to pressure in a line from said primary source to the quick release valve to discharge fluid from the holding chamber to exhaust when the pressure in the line to said primary source falls below a predetermined pressure.

21. A brake system according to claim 20 wherein fluid pressure is supplied to the quick release valve from said primary source via the pressure protection valve.

22. A brake system according to claim 21 wherein a one-way valve is provided in a line from the pressure protection valve to the quick release valve to prevent flow in the direction from the quick release valve to the pressure protection valve.

23. A brake system according to claim 22 wherein a branch line extends from said supply line on the quick release valve side of the one way check valve via a second one-way check valve which prevents flow of fluid in the direction towards the quick release valve and which extends to the main fluid pressure supply line from the primary source on the upstream side of the pressure protection valve.

24. A brake system according to claim 1 wherein the vehicle brakes comprise spring brakes having spring biasing means adapted to apply the brakes but whose effect is normally rendered inoperative by fluid pressure applied to a hold-off chamber at a pressure above a predetermined pressure and in which normal operation of the brakes occurs by application of said brake pressure to an operating chamber.

* * * * *